Sept. 22, 1970 GERHARD-GÜNTER GASSMANN 3,530,313

CIRCUIT ARRANGEMENT TO CONVERT RECTANGULAR PULSES

Filed March 28, 1968

INVENTOR

GERHARD-GÜNTER GASSMANN

BY Philip M. Bolton

ATTORNEY

United States Patent Office 3,530,313

Patented Sept. 22, 1970

3,530,313

CIRCUIT ARRANGEMENT TO CONVERT RECTANGULAR PULSES

Gerhard-Günter Gassmann, Berkheim, Germany, assignor to International Standard Electric Corporation, New York, N.Y., a corporation of Delaware Filed Mar. 28, 1968, Ser. No. 716,893
Claims priority, application Germany, Apr. 5, 1967, 1,512,549
Int. Cl. H03k *5/00*
U.S. Cl. 307—261 3 Claims

ABSTRACT OF THE DISCLOSURE

A circuit which converts input pulses into pairs of pulses of alternate polarity by utilizing the storage time delay effect of a transistor instead of the conventionally used tuned circuit. The embodiment comprises a transistor which converts rectangular input pulses into output pulses with a time duration which is greater than that of the input pulse by an amount equal to the storage time of said transistor and a parallel feed which transmits the signal at the input to the output where it is added to the transistor output to produce pulse pairs of alternate polarity.

BACKGROUND OF THE INVENTION

The present invention relates to a circuit arrangement which converts rectangular into pairs of pulses of alternate polarity.

Circuit arrangements are known which convert rectangular pulses into pairs of pulses of alternate polarity. One such circuit arrangement contains amplitude filters, that is, it operates with a tank circuit which is heavily attenuated after a complete period. A second circuit arrangement is known in which alternate positive and negative pulses are obtained by differentiating the original pulses. The pulses obtained by the differentiation, are asymmetrical.

It is the object of the present invention to provide a circuit arrangement for converting rectangular pulses into pairs of pulses of alternate polarity which requires no tank circuit and can be manufactured readily using integrated circuit techniques.

SUMMARY OF INVENTION

According to the invention, a source of pulse signals whose voltage alternates between a turn-on and a cut-off level is applied to a semiconductor element. In response to the pulse signals and the storage delay time in said element an output pulse signal, whose amplitude is approximately zero for a time equal to the sum of the storage time in said element and the duration time of each of said input pulses, is derived. This signal is added to the input signal to produce pulse pairs of alternate polarity.

Figure 1:
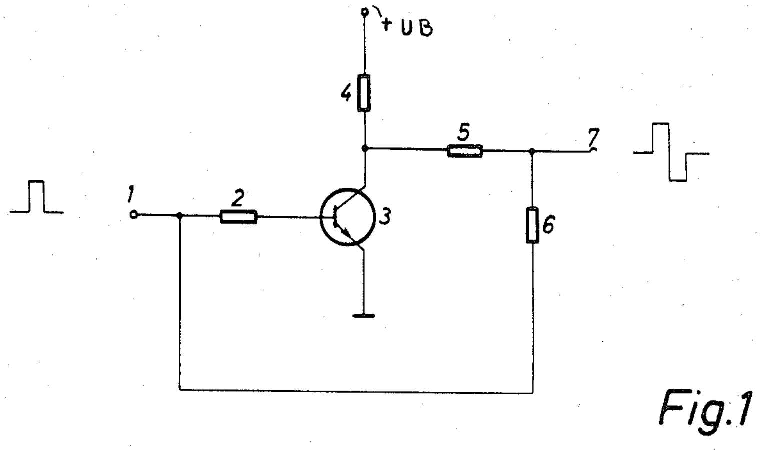
Figures 2A, 2B, 2C:
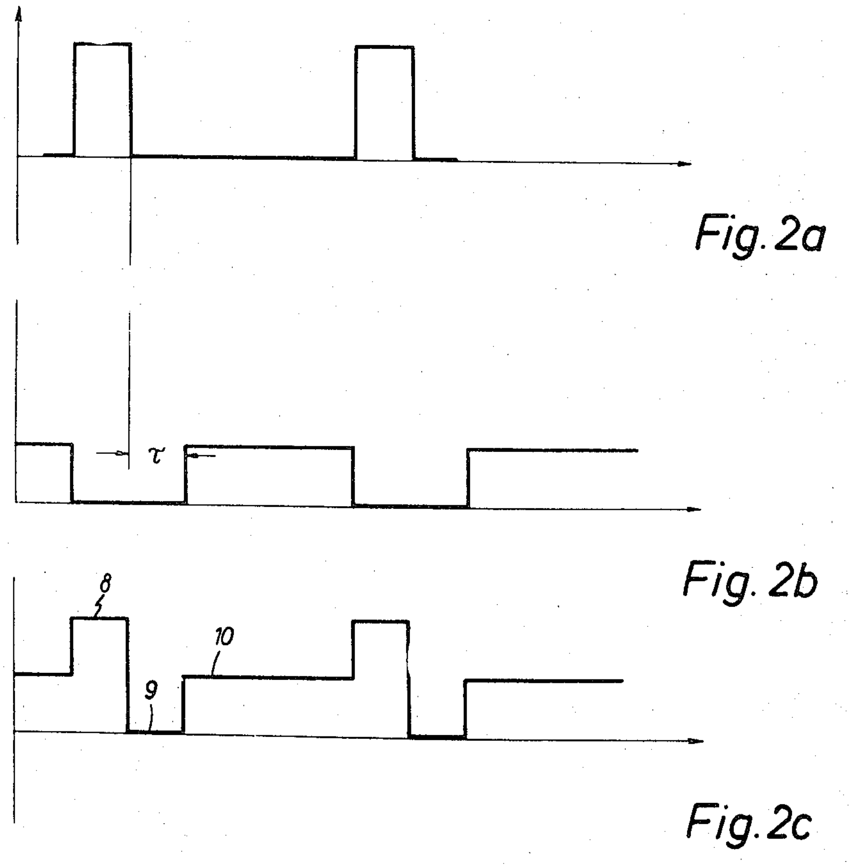

The above mentioned and other objects of this invention will become apparent by reference to the following description taken in conjunction with the accompanying drawings in which:

FIG. 1 is a schematic diagram of a circuit according to the invention;

FIG. 2*a* is an idealized waveform of an assumed input signal;

FIG. 2*b* is an idealized waveform of the voltage appearing at the collector of transistor 3; and FIG. 2*c* is an idealized waveform of the output signal.

FIG. 1 illustrates an example of the arrangement according to the invention. In this example, a pulse signal as illustrated in FIG. 2*a* is applied to the input terminal 1. This signal is transmitted to the base of transistor 3 via resistor 2. The leading or turn-on edge of each received pulse causes the collector current instantly to increase and the collector voltage to decrease to approximately zero volts. The trailing or turn-off edge of the pulse, however, does not cause the voltage across transistors 3 to change instantaneously because of the storage time delay effect inherent in transistors. This causes the collector voltage to remain at about zero volts for the additional time $\tau$, the storage delay time. The voltage across the collector as idealized is illustrated in FIG. 2*b*.

The signal present at the collector is transmitted to output terminal 7 via resistor 5. The signal present at the input terminal 1 is transmitted to the output terminal 7 via resistor 6. The resulting alternating polarity pulse pair signal is the sum of these two signals and is illustrated in FIG. 2*c*. The width of the first pulse 8 is equal to the width of the input pulse and the width of the second pulse 9 is equal to the storage time of the transistor. The storage delay time can be varied by changing the value of resistor 2 or by applying an additional bias voltage to terminal 1. The DC reference level 10 of the output signal is determined by the values chosen for resistors 5 and 6.

It is to be understood that the foregoing description of the example of this invention is made by way of example only and is not to be considered as a limitation on its scope.

I claim:

1. A circuit arrangement which converts rectangular pulses to pulse pairs of alternate polarity comprising:
   - a semiconductor element,
   - a source of input pulse signals whose voltage alternates between a turn-on and a cut-off level for said element;
   - means responsive to each of said pulse signals and the storage time in said element for deriving said semiconductor element an output pulse signal whose amplitude is approximately zero for a time equal to the sum of the storage delay time in said element and the duration time of each of said input pulses,
   - said responsive means including means for applying said input pulse signals to said semiconductor element, and
   - means for adding said output pulse signal to the input signal to produce pulse pairs of alternate polarity.

2. A circuit according to claim 1 wherein said semiconductor element is a transistor.

3. A circuit according to claim 1 wherein said applying means applies said input pulses to the base of said transistor and said output pulse signals are derived from the collector.

References Cited

UNITED STATES PATENTS

| | | | |
|---|---|---|---|
| 3,089,037 | 5/1963 | Ross | 307—293 X |
| 3,287,647 | 11/1966 | Engel | 328—162 X |
| 3,456,199 | 7/1969 | Van Gerwen | 307—261 X |

DONALD D. FORRER, Primary Examiner

S. D. MILLER, Assistant Examiner

U.S. Cl. X.R.

307—262, 268, 293, 300; 328—27, 61